United States Patent [19]
Iwamatsu

[11] Patent Number: 4,860,010
[45] Date of Patent: Aug. 22, 1989

[54] AUTOMATIC DRIFT CONTROL CIRCUIT
[75] Inventor: Takanori Iwamatsu, Otawara, Japan
[73] Assignee: Fujitsu Limited, Kawasaki, Japan
[21] Appl. No.: 66,960
[22] Filed: Jun. 29, 1987
[30] Foreign Application Priority Data
  Jun. 27, 1986 [JP] Japan ................. 61-149616
[51] Int. Cl.$^4$ ................. H03K 13/02; H03M 1/06
[52] U.S. Cl. ................. 341/118; 341/139; 375/17
[58] Field of Search ............. 340/347 CC, 347 AD; 328/162; 307/359; 375/17; 364/571; 324/130

[56] References Cited
U.S. PATENT DOCUMENTS

| | | | |
|---|---|---|---|
| 3,475,748 | 10/1969 | Price | 340/347 CC |
| 4,186,384 | 1/1980 | Acker | 340/347 CC |
| 4,335,402 | 10/1982 | Kromer, III et al. | 375/17 |
| 4,377,759 | 3/1983 | Ohhata | 238/162 |
| 4,590,458 | 5/1982 | Evans et al. | 340/347 CC |
| 4,602,374 | 7/1986 | Nakamura et al. | 340/347 CC |

Primary Examiner—Vit W. Miska
Attorney, Agent, or Firm—Staas & Halsey

[57] ABSTRACT

A received multi-level signal is demodulated and when drift of the received signal is comparatively small, an error signal is selected, integrated and added to the received signal to correct the drift. The error signal is indicative of a condition of an anglog-to-digital conversion or decision level of the received signal. The condition of the decision level is monitored and when, on the basis of the monitored decision level it is detected that drift of the received signal is large, the error signal is selected corresponding to a specified range and includes bit signals of higher order than a most significant bit and of lower order than a least significant bit of the converted digital signal. The selected error signal is then integrated and added to the demodulated received multi-level signal. A pseudo pulling condition in feedback control is thereby prevented.

9 Claims, 3 Drawing Sheets

AUTOMATIC DRIFT CONTROL CIRCUIT

BACKGROUND OF THE INVENTION

The present invention relates to an automatic drift control circuit which automatically corrects drift of a multi-level demodulated signal.

Demodulation of a received multi-level QAM (Quadrature Amplitude Modulation) signal with a recovered carrier involves converting it to a digital signal by level decision. If the demodulated signal, if the demodulated output signal level deviates from the correct level, it can no longer be converted into a correct digital signal and therefore it must be corrected automatically. For this purpose, an automatic drift control circuit is used.

The demodulated signal is amplified up to a specified level by an amplifier, input to an A/D converter through an adder and then converted into a digital signal consisting of a plurality of bits. For example, when a 256-level QAM signal is demodulated and converted into a digital signal, a 4-bit data structure can be obtained since the I and Q channels respectively become 16-level data. A single bit position, namely the 5th bit from the most significant bit (MSB) indicates whether or not the input signal is higher or lower than the decided level among the specified 16 levels. Therefore, it is used as an error signal and applied to an integrator for integration. The integrated output therefrom is applied to the adder and thereby drift of demodulated signal is corrected.

When drift of the demodulated multi-level signal to be input to the A/D converter is within a range of a decision level for a given error signal, the drift can be corrected and a multi-level signal can be decided correctly. But, if level variation of the received signal becomes large due to fading, etc. and thereby causes drift of the multi-level signal become large, the demodulated signal exceeds a threshold level for data decision in the A/D converter and polarity of the error signal is thereby inverted causing a pseudo pulling condition. Namely, the signal is pulled under the condition that the level of the multi-level signal is shifted upward or downward for the input level range of the A/D converter. In such a pseudo pulling condition, correct data cannot be obtained.

SUMMARY OF THE INVENTION

It is an object of the present invention to realize automatic correction of drift by preventing such a pseudo pulling condition explained previously.

When drift of a multi-level signal is comparatively small, the error signals of signals in each decision level are integrated and then added to the demodulated signal. When it is detected that drift becomes large by monitoring the decision level condition, the integrated output obtained from selecting the error signal of the specified range includes at least the bit signals higher order than the most significant bit or lower order than the least significant bit and is added to the demodulated signal. Thereby, pseudo pulling can be prevented.

The above and other objects and advantages of the present invention will be apparent to those skilled in the art, from the following details of construction of the present invention.

DESCRIPTION OF THE PREFERRED EMBODIMENTS

Figure 1:
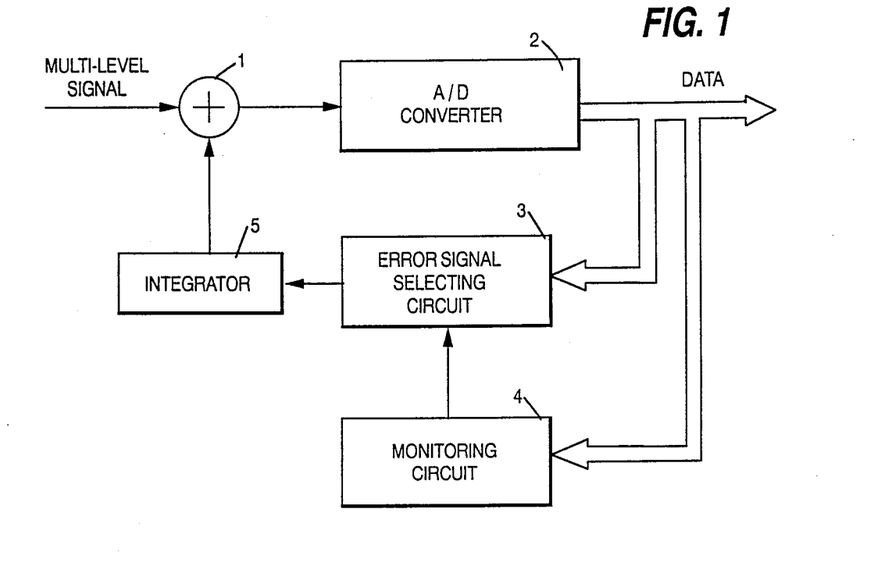
FIG. 1 is a basic block diagram of the present invention.

FIG. 1 is a basic block diagram of the present invention. In FIG. 1, a multi-level signal obtained, for example, by demodulating the QAM signal is input to the analog-to-digital (A/D) converter 2 through an adder 1. The A/D converter 2 converts the demodulated multi-level signal into a digital signal corresponding to a level thereof and simultaneously outputs the bits $D_1$, $D_4$ and the bits $D_5$, $D_6$ to an error signal selecting circuit 3 and a monitoring circuit 4, respectively. The error signal selecting circuit 3 always outputs an error signal, in a normal condition, corresponding to the decision level condition signal obtained from the monitoring circuit 4 or, in the false condition, only when the specified level is decided by the A/D converter 2. Namely, the error signal selecting circuit 3 selects and outputs the error signal which seems to be correct under the false condition. The integrator 5 integrates error signals from the error signal selecting circuit 3 and provides an output to the adder 1 as the drift control signal. The adder 1 adds the integrated signal to multi-level signal so that drift of the multi-level signal may be corrected.

Figure 2:
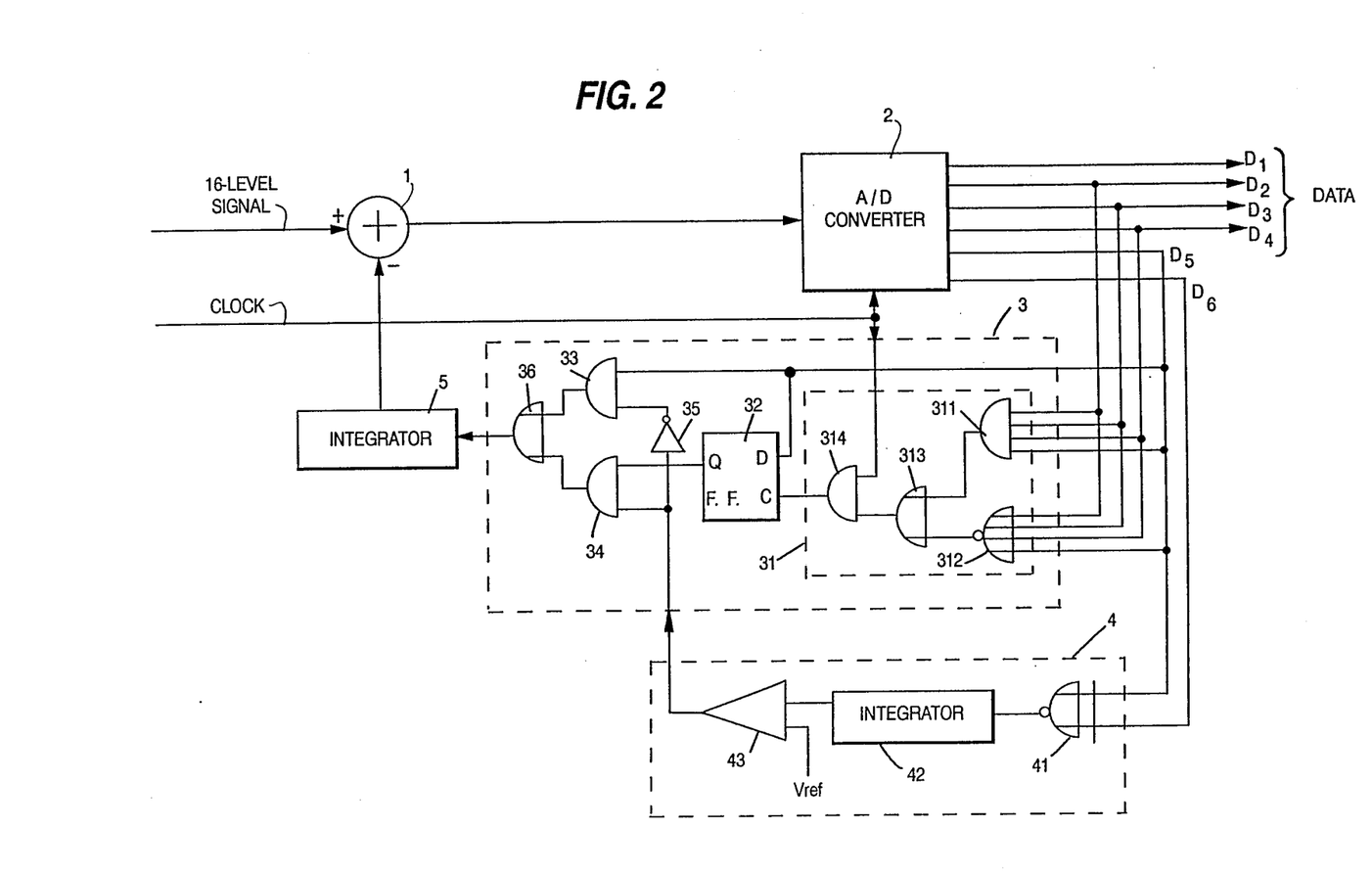
FIG. 2 is a block diagram of an embodiment of the present invention corresponding to FIG. 1.

FIG. 2 is a block diagram of an embodiment which may be used for any of the 16-level signals of I and Q channels obtained by demodulating a 256-level QAM signal.

Figure 3:
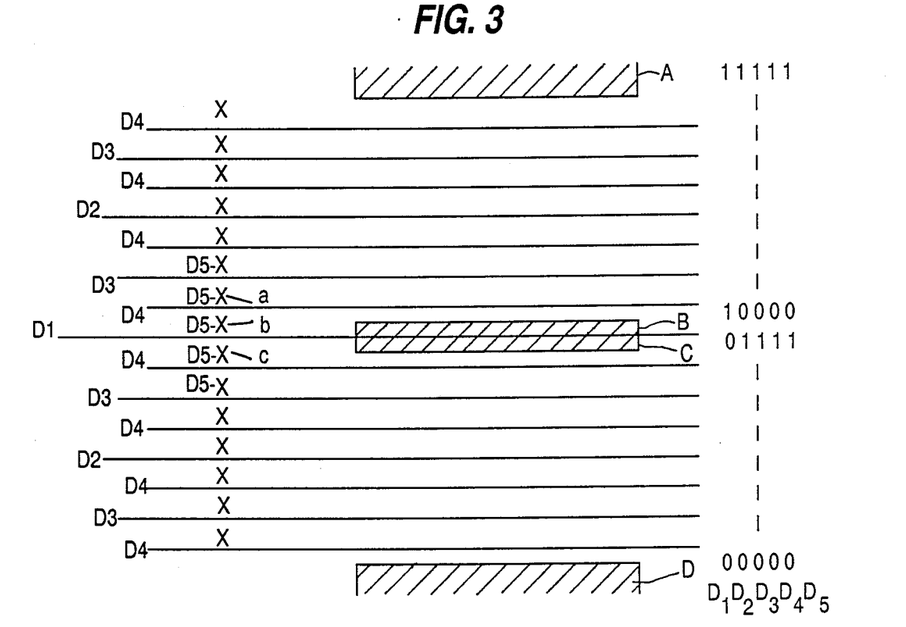
FIG. 3 and FIG. 4 indicate conversion levels of the A/D converter.
Figure 4:
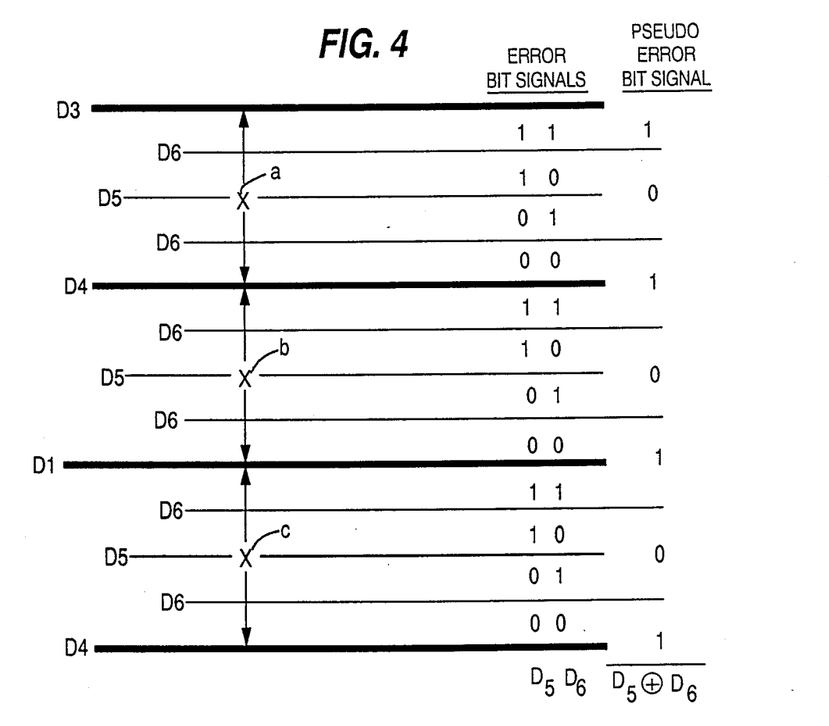

In FIG. 2, the 16-level signal is input to the A/D converter 2 through the adder 1. FIG. 3 and FIG. 4 indicate decision levels of the A/D converter 2. The A/D converter 2 outputs the data $D_1$–$D_4$ of 4 bits which indicate to which level among 16 levels, indicated by X in FIG. 3, the input signal corresponds. The A/D converter 2 also outputs as shown in FIG. 4, $D_5$ and $D_6$, 2 bits of which indicate finer resolution, i.e., ranges a, b, c . . . , by dividing each decision level into four ranges. In FIG. 3 and FIG. 4, the horizontal line indicates the threshold level of each bit.

In FIG. 4 for example, when the signal which should be decided as the level b is located between the level b and the threshold level of $D_4$ which is higher than the level b, the bit $D_5$ as the error signal becomes 1 allowing the judgement that drift occurs in a positive direction. However, when the signal exceeds the threshold level of $D_4$ and is located between such threshold level and the level a, the bit $D_5$ becomes 0 erroneous error signal which indicates that drift occurs in an opposite or negative direction is generated and output. However, when the signal is within the range A of FIG. 3 which is higher than the highest level among 16 levels or in the range of D which is lower than the lowest level, there should be no signal generated at the outside of such levels. Accordingly, a correct error signal can be obtained. Thereby even when the decision level condition is poor, correct drift control can be realized by executing drift control through the selection of the error signal obtained when the input signal to the A/D converter 2 is within such a range.

However, if the interval of respective levels of the 16-level signal becomes smaller than the interval of decision level of the A/D converter 2 due to the reason that the gain of an amplifier (not illustrated in FIG. 2) in a preceding stage is too small, the signal as a whole is concentrated at the center. The signal entering range A or D of FIG. 3 is reduced and it becomes difficult to obtain the signal for control. Therefore, the error signal is selected not only in the ranges A and D but also in the center ranges B and C.

Results of decision level conditions can be judged as follows.

As indicated in FIG. 4, the range where bits $D_5$ and $D_6$ take the same value, namely where the exclusive NOR of $D_5$ and $D_6$ becomes 1 is far from the correct level. Therefore, a decision level condition can be judged from the fact that the rate of the input signal to enter such a range is higher or lower than a certain reference value.

In FIG. 2, the logic circuit 31 including an AND circuit 311, a NOR circuit 312, an OR circuit 313 and an AND circuit 314 outputs a pulse synchronized with a clock signal to the A/D converter when the input signal enters the ranges of A, B, C or D of FIG. 3.

The flip-flop 32 holds the error signal $D_5$ when such a pulse is generated. The logic circuit consisting of the AND circuits 33, 34, inverter 35 and OR circuit 36 selects and outputs the error signal $D_5$ and the error signal having been held by the flip-flop 32, in accordance with the decision level condition signal from the monitoring circuit 4. The circuits 31–36 correspond to the error signal selecting circuit 3 of FIG. 1.

In FIG. 2, the exlusive NOR 41 outputs the signal indicated by $D_5 \oplus D_6$ in FIG. 4 as a pseudo error signal and the integrator 42 integrates such the pseudo error signal and outputs a pseudo error rate. This pseudo error rate is compared with a reference value $V_{ref}$ in comparator 43. If it is lower than the reference value, a decision level condition is considered to be acceptable but if it is higher than the reference value, the decision level condition is considered to be unacceptable. The decision level condition signal from comparator 43 is then output to the error signal selecting circuit 3. The circuits 41–43 correspond to the monitoring circuit 4 of FIG. 1.

As described previously, when the decision level condition of the A/D converter 2 is acceptable, an error signal is used even in the case where the input is in any range, but when the decision level condition is unacceptable, the error signal is selected and used for drift control. Thereby, adequate control can be realized in accordance with the decision level condition.

As a control method utilizing an error signal, automatic gain control is also known in addition to automatic drift control. In the case where the input signal is positive while the error signal is positive or where the input signal is negative while the error signal is negative (i.e. positive feedback control), the gain of an amplifier in a preceding stage of the A/D converter can be considered to be too large and where polarity of the input signal is different from that of error signal (i.e. negative feedback control), such gain is considered too small. Therefore, the gain of an amplifier can be controlled in accordance with an integrated value by integrating an exclusive OR product of the first bit ($D_1$) which indicates the polarity among the outputs of the A/D converter and the error signal ($D_5$ in the case of 16-level signal) as the gain error signal. Even in the case of automatic gain control, the gain error signal can be selected and controlled when the decision level condition becomes unacceptable as in the case of drift control.

Figure 5:
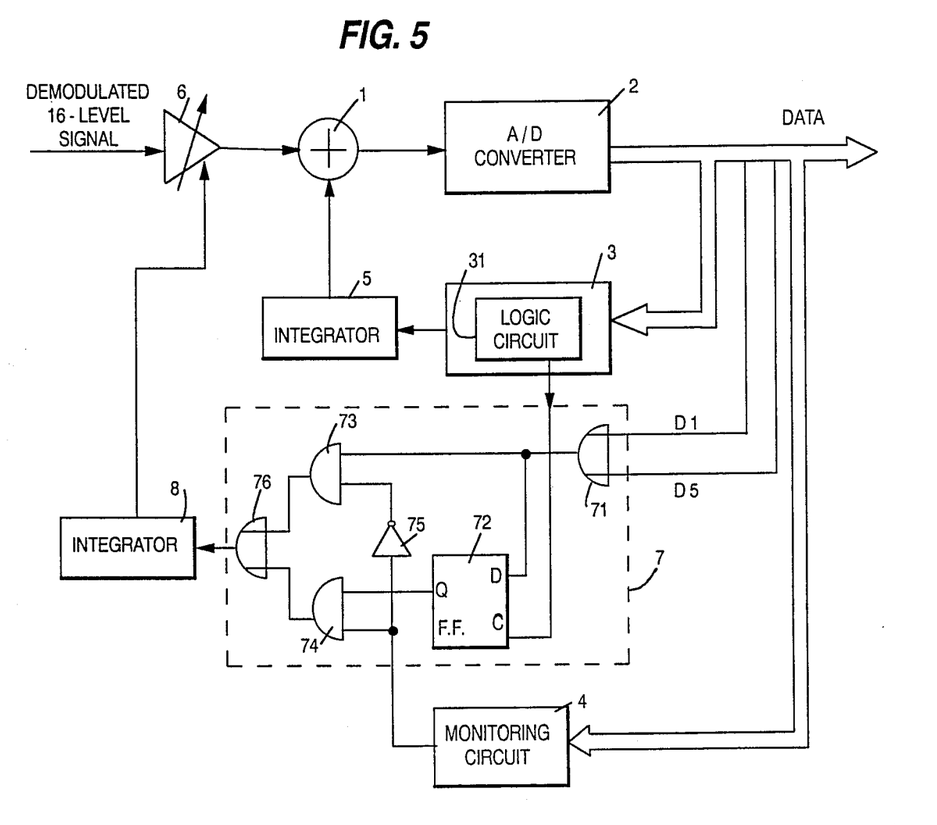
FIG. 5 is a block diagram of another embodiment of the present invention.

FIG. 5 is a block diagram of another embodiment of the present invention. In FIG. 5, the adder 1, A/D converter 2, error signal selecting circuit 3, monitoring circuit 4 and integrator 5 are similar to those of FIG. 2. A variable gain amplifier 6 is provided at the preceding stage of the adder 1 and the output level is controlled to a constant value by a gain control signal described later. $D_1$ and $D_5$ among the outputs of A/D converter 2 are input to a gain error signal selecting circuit 7. In the gain error signal selecting circuit 7, the exclusive OR circuit 71 generates a gain error signal from the exclusive OR product of $D_1$ and $D_5$. The logic circuit consisting of flip-flop 72, AND circuits 73, 74, inverter 75 and OR circuit 76 selects and outputs the gain error signal to the integrator 8 with operations similar to that of the circuits 32 and 36 in the error signal selecting circuit 3. This selection occurs on the basis of the output from logic circuit 31 in the error signal selecting circuit 3 and the decision level condition signal from the monitoring circuit 4. The integrator 8 integrates the gain error signal and outputs it to the variable gain amplifier as a gain control signal. Thereby, gain control can be executed in accordance with the decision level condition.

I claim:

1. An automatic drift control circuit for automatically correcting a received multi-level demodulated input signal in accordance with a drift control feedback signal, said control circuit comprising:
   an adding circuit adding the drift control feedback signal to the received multi-level input signal to provide an added multi-level signal;
   an A/D converter operatively connected to said adding circuit, providing said added multi-level signal as parallel digital output data corresponding to decision levels having ranges;
   a monitoring circuit operatively connected to said A/D converter, detecting a decision level condition based on said digital output data and providing a corresponding decision condition signal;
   an error signal selecting circuit operatively connected to said A/D converter and said monitoring circuit, selecting and providing an error signal when said added multi-level signal is greater than a highest range of the decision levels and when said added multi-level signal is less than a lowest range of the decision levels, in accordance with said decision level condition signal; and
   a first integrator operatively connected to said error signal selecting circuit and said adding circuit, integrating said error signal and providing an integrated error signal as the drift control feedback signal to said adding circuit.

2. An automatic drift control circuit according to claim 1, wherein the multi-level signal is a 16 level signal, said A/D converter provides an output of 4-bit data and an output of 2-bit data, and said error signal selecting circuit comprises:
   a first logic circuit detecting whether the digital output data is within a maximum decision level range, a median decision level range and a minimum decision level range;

a first flip-flop operatively connected to said A/D converter and said first logic circuit, receiving a bit from said parallel digital output data, holding the bit during detection by said first logic circuit and providing a first hold bit in accordance with detection by said first logic circuit; and a second logic circuit operatively connected to said first flip-flop and said monitoring circuit, selectively providing one of the bit from said parallel digital output data and said first hold bit as said error signal in accordance with said decision condition signal.

3. An automatic drift control circuit according to claim 2, wherein said monitoring circuit comprises:

a first exclusive NOR gate, receiving the output of 2-bit data from said A/D converter and providing a first exclusive NOR signal;

a second integrator operatively connected to said first exclusive NOR gate and providing an integrated exclusive NOR signal;

a comparator circuit operatively connected to said second integrator and providing said decision condition signal in accordance with said integrated exclusive NOR signal and a reference voltage.

4. An automatic drift control circuit according to claim 3, further comprising:

a variable gain amplifier operatively connected to said adding current, amplifying the multi-level demodulated signal in accordance with a gain control signal and providing a variable gain signal to said adding circuit;

a gain error signal selecting circuit operatively connected to said A/D converter, said error signal selecting circuit and said monitoring circuit and providing a gain error signal based on said digital output data in accordance with detection by said first logic circuit and said decision condition signal;

a third integrator operatively connected to said gain error signal selecting circuit and said variable gain amplifier, and integrating said gain error signal to provide an integrated gain error signal as the gain control signal controlling said variable gain amplifier.

5. An automatic drift control circuit according to claim 4, wherein said gain error signal selecting circuit comprises:

a second exclusive NOR gate receiving said digital output data and providing a second exclusive NOR signal;

a second flip-flop operatively connected to said second exclusive NOR gate and said error signal selecting circuit, storing said second exclusive NOR signal and providing a second hold bit in accordance with detection by said first logic circuit of said error signal selecting circuit;

a third logic circuit operatively connected to said second exclusive NOR gate and said second flip-flop, selectively providing one of said exclusive NOR signal and said second hold bit as said gain error signal in accordance with said decision condition signal.

6. An automatic drift control circuit for automatically correcting a received multi-level demodulated input signal having 16 levels, in accordance with a drift control feedback signal, said control circuit comprising:

an adding circuit adding the drift control feedback signal to the received multi-level input signal to provide an added multi-level signal;

an A/D converter operatively connected to said adding circuit, providing said added multi-level signal as parallel digital output data corresponding to decision levels having ranges, said parallel digital output data including 2-bit digital output data and 4-bit digital output data;

a monitoring circuit operatively connected to said A/D converter, detecting a decision level condition based on said digital output data and providing a corresponding decision condition signal;

an error signal selecting circuit operatively connected to said A/D converter and said monitoring circuit, selecting a correct error signal responsive to said digital output data to provide an error signal in accordance with said decision condition signal, said error signal selecting circuit comprising:

a first logic circuit detecting whether the digital output data is within a maximum decision level range, a median decision level range and a minimum decision level range;

a first flip-flop operatively connected to said A/D converter and said first logic circuit, receiving a bit from said parallel digital output data, holding the bit during detection by said first logic circuit and providing a first hold bit in accordance with detection by said first logic circuit; and a second logic circuit operatively connected to said first flip-flop and said monitoring circuit, selectively providing one of the bit from said parallel digital output data and said first hold bit as said error signal in accordance with said decision condition signal; and a first integrator operatively connected to said error signal selecting circuit and said adding circuit, integrating said error signal and providing an integrated error signal as the drift control feedback signal to said adding circuit.

7. An automatic drift control circuit according to claim 6, wherein said monitoring circuit comprises:

a first exclusive NOR gate, receiving the output of 2-bit data from said A/D converter and providing a first exclusive NOR signal;

a second integrator operatively connected to said first exclusive NOR gate and providing an integrated exclusive NOR signal; and a comparator circuit operatively connected to said second integrator and providing said decision condition signal in accordance with said integrated exclusive NOR signal and a reference voltage.

8. An automatic drift control circuit according to claim 7, further comprising:

a variable gain amplifier operatively connected to said adding current, amplifying the multi-level demodulated signal in accordance with a gain control signal and providing a variable gain signal to said adding circuit;

a gain error signal selecting circuit operatively connected to said A/D converter, said error signal selecting circuit and said monitoring circuit, and providing a gain error signal based on said digital output data in accordance with detection by said first logic circuit and said decision condition signal; and a third integrator operatively connected to said gain error signal selecting circuit and said variable gain amplifier, and integrating said gain error signal to provide an integrated gain error signal as the gain control signal controlling said variable gain amplifier.

9. An automatic drift control circuit according to claim 8, wherein said gain error signal selecting circuit comprises:
- a second exclusive NOR gate receiving said digital output data and providing a second exclusive NOR signal;
- a second flip-flop operatively connected to said second exclusive NOR gate and said error signal selecting circuit, storing said second exclusive NOR signal and providing a second hold bit in accordance with detection by said first logic circuit of said error signal selecting circuit; and
- a third logic circuit operatively connected to said second exclusive NOR gate and said second flip-flop, selectively providing one of said exclusive NOR signal and said second hold bit as said gain error signal in accordance with said decision condition signal.

* * * * *

UNITED STATES PATENT AND TRADEMARK OFFICE
CERTIFICATE OF CORRECTION

| | | |
|---|---|---|
| PATENT NO. | : | 4,860,010 |
| DATED | : | August 22, 1989 |
| INVENTOR(S) | : | Takanori Iwamatsu |

It is certified that error appears in the above-identified patent and that said Letters Patent is hereby corrected as shown below:

<u>Title Page</u>
[56] References cited "4,335,402" s/b --4,355,402--.

Col. 1, line 12, delete "signal, if the demodulated";
line 13, delete "output".

Col. 2, line 58, after "0" insert --and an--;

Signed and Sealed this

Twenty-fourth Day of July, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,860,010
DATED : August 29, 1989
INVENTOR(S) : Jean-Charles Lacour It is certified that error appears in the above-identified patent and that said Letters Patent is hereby corrected as shown below:

First page, 4th line of ABSTRACT, "160°0C." should read --160°C--;

Col. 1, line 28, "1160°C" should read --160°C--;

Col. 1, line 41, "wtih at least one bear ring" should read --with at least one bead ring--;

Col. 2, line 5, delete "de" ;

Col. 4, line 34, "VI-I" should read --VI-VI--;

Col. 4, line 49, "assemlby" should read --assembly--;

Col. 4, line 56, "sheaths I" should read --sheaths 1--;

Col. 4, line 62, "the cool" should read --to cool--;

Col. 5, line 44, "thye" should read --the--;

UNITED STATES PATENT AND TRADEMARK OFFICE
CERTIFICATE OF CORRECTION

PATENT NO. : 4,860,010
DATED : August 29, 1989
INVENTOR(S) : Jean-Charles Lacour Page 2 of 2

It is certified that error appears in the above-identified patent and that said Letters Patent is hereby corrected as shown below:

Col. 6, line 41, "each wires" should read --each wire--;

Col. 6, line 45, "32 0.5 mm" should read -- = 0.5 mm--;

Col. 6, line 48, "$mm_2$" should read --$mm^2$--.

Signed and Sealed this

Twenty-fifth Day of September, 1990

Attest:

HARRY F. MANBECK, JR.

*Attesting Officer*  *Commissioner of Patents and Trademarks*